United States Patent
Confalonieri et al.

(10) Patent No.: US 6,958,949 B2
(45) Date of Patent: Oct. 25, 2005

(54) DECODING STRUCTURE FOR A MEMORY DEVICE WITH A CONTROL CODE

(75) Inventors: Emanuele Confalonieri, Milan (IT); Marco Sforzin, Cantu' (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 355 days.

(21) Appl. No.: 10/331,177

(22) Filed: Dec. 27, 2002

(65) Prior Publication Data

US 2003/0149831 A1 Aug. 7, 2003

(30) Foreign Application Priority Data

Dec. 28, 2001 (IT) .......................... MI2002A2817

(51) Int. Cl.[7] .............................................. G11C 8/00
(52) U.S. Cl. ......................... 365/230.06; 365/230.03; 365/238.5
(58) Field of Search .......................... 365/189.01, 214, 365/230.01, 230.03, 230.06, 238.5

(56) References Cited

U.S. PATENT DOCUMENTS

| | | | |
|---|---|---|---|
| 6,209,113 B1 | 3/2001 | Roohparvar | 714/773 |
| 6,466,508 B1 * | 10/2002 | Miyawaki et al. | 365/230.03 |
| 6,507,534 B2 * | 1/2003 | Balluchi | 365/230.06 |

* cited by examiner

Primary Examiner—VanThu Nguyen
(74) Attorney, Agent, or Firm—Lisa K. Jorgenson; Allen, Dyer, Doppelt, Milbrath & Gilchrist, P.A.

(57) ABSTRACT

A decoding structure for a memory device with a control code is used in a memory including a matrix of memory cells grouped into pages to each of which a block of control information is associated, and a plurality of reading elements for reading a plurality of pages in parallel. The decoding structure selectively connects each reading element to a plurality of memory cells, and selectively connects each memory cell to a plurality of reading elements.

32 Claims, 5 Drawing Sheets

DECODING STRUCTURE FOR A MEMORY DEVICE WITH A CONTROL CODE

FIELD OF THE INVENTION

The present invention relates to memories, and, more particularly, to a decoding structure for a memory device with a control code.

BACKGROUND OF THE INVENTION

Control codes, for example, Error Correction Codes (ECC), are commonly used for improving the reliability of a memory device, such as a flash E²PROM with multilevel cells. As known, a multilevel cell can take a number of states higher than two (to each one is associated a corresponding logic value). Typically, the number of states is equal to a power of 2, with a cell supporting $2^N$ states storing N bits of information. Each state is defined by a respective range of a specific physical quantity (for example, a voltage).

However, the increased number of possible states for the memory cell involves a reduction of the voltage ranges associated with each logic value (for the same voltage window that is available for operating the memory cell). This makes the device more sensitive to noise, since a lower voltage change can bring about the reading of a wrong logic value.

The error correction codes add redundant information to every predetermined set of bits (a page). Such redundant information is used to detect and correct (if possible) any errors in the page. This allows some defective cells to be accepted in the memory device without jeopardizing its operation. In this way, the production cost of the memory device can be significantly reduced.

However, the above-described structure requires the reading of a whole page (to verify its correctness), before the bits contained therein can be used. This results in some constraints on the operation of the memory device, for example, in the case of reading in the burst mode wherein the information required is output in succession at every clock signal.

In fact, when the reading in the burst mode involves a set of bits between two consecutive pages, both pages must be read completely before outputting the required information. This calls for the introduction of wait cycles, which slows down operation of the memory device.

A possible approach to such a drawback would be to read two consecutive pages in parallel (for example, an even page and an odd page). Nevertheless, in a standard decoding structure each reading element is selectively connected to a memory cell of an associated set (through selection elements controlled by the same signals for all the sets). Therefore, this also does not allow the reading in the burst mode of a set of bits between an odd page and an even page.

A different decoding structure (known as smart decoding) has been proposed for performing readings in the burst mode from any position in a memory device with cells only supporting two levels. In this structure, alternative paths are added so as to allow memory cells in different positions in each set to be reached at the same time. However, this requires the introduction of additional selection signals. Moreover, the management of these selection signals is rather complex and involves substantial changes to the operation of the memory device. Finally, the proposed decoding structure cannot be readily applied to a memory device with multilevel cells.

SUMMARY OF THE INVENTION

It is an object of the present invention to overcome the above-mentioned drawbacks.

Briefly, the present invention provides a decoding structure for a memory device with a control code including a matrix of memory cells grouped into pages to each one of which a block of control information is associated, and a plurality of reading elements for reading a plurality of pages in parallel, wherein the decoding structure includes a circuit or means for selectively connecting each reading element to a plurality of memory cells, and a circuit or means for selectively connecting each memory cell to a plurality of reading elements.

Moreover, the present invention also provides a memory including this decoding structure.

BRIEF DESCRIPTION OF THE DRAWINGS

Further features and the advantages of the present invention will be made clear by the following description of a preferred embodiment thereof, given purely by way of a non-restrictive indication, with reference to the attached figures, in which.

DETAILED DESCRIPTION OF THE PREFERRED EMBODIMENTS

Figure 1:
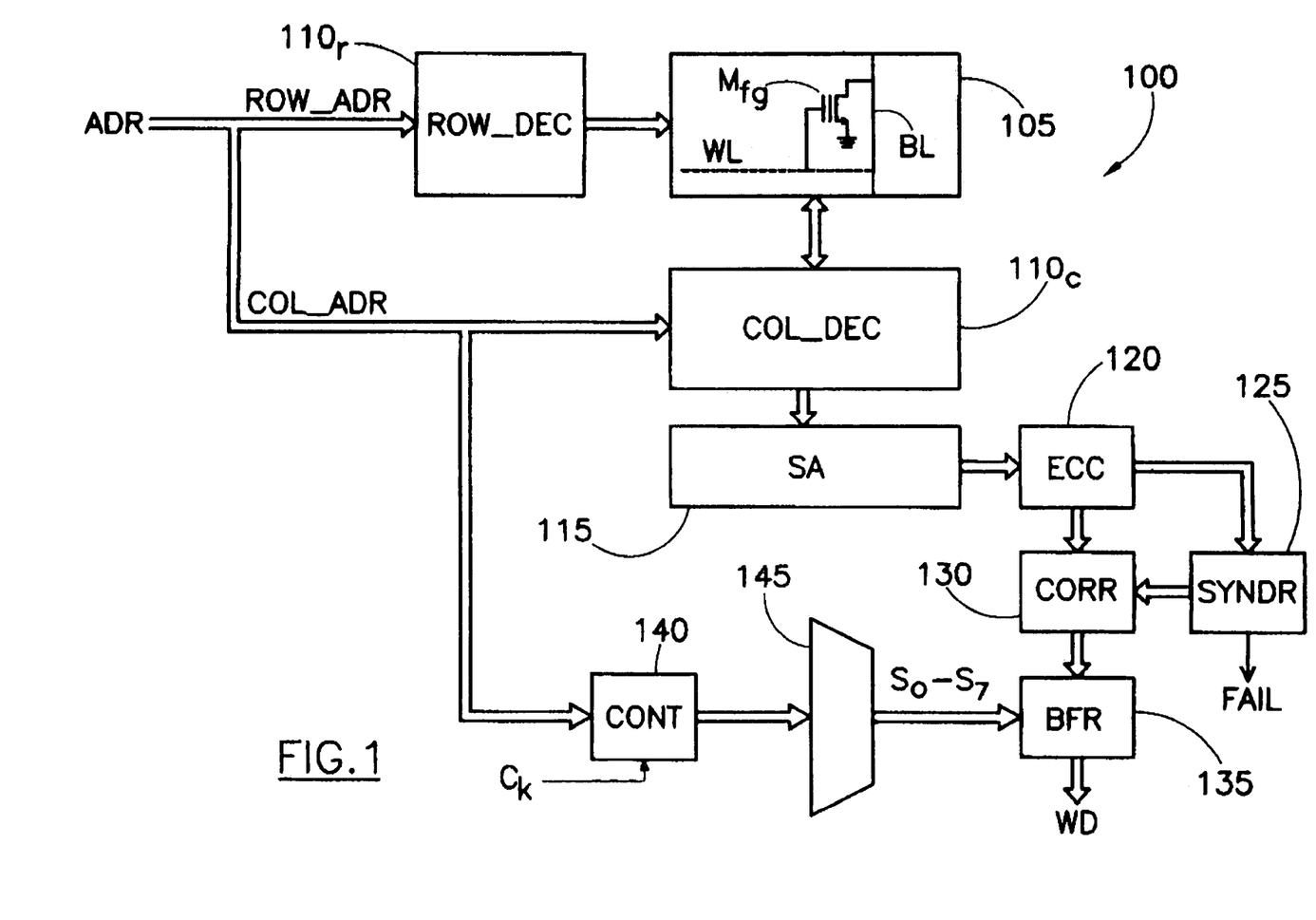
FIG. 1 is schematic block diagram of a reading section of a memory in which the decoding structure of the present invention can be used.

With reference in particular to FIG. 1, a reading section of a memory device 100, for example, a flash E²PROM, is illustrated. The memory 100 includes a matrix 105 of memory cells, each one formed by a floating gate MOS transistor Mfg. The memory cell Mfg can be programmed to four different levels. Each level is associated with a corresponding value of a threshold voltage of the transistor, which threshold voltage depends on the charge in its floating gate. Each level represents a different logic value, so that the memory cell Mfg stores two bits of information ($4=2^2$).

The matrix 105 is organized into a plurality of rows and a plurality of columns (for example, 512 rows×1024 columns). The memory cells Mfgs of each row have a gate terminal connected to a correspondent word line WL, while the memory cells Mfgs of each column have a drain terminal connected to a correspondent bit line BL (the source terminals of all the memory cells Mfg are typically taken at a reference voltage, or ground).

The information stored in the memory 100 is simultaneously processed in blocks of 16 bits, each one defining a word WD. Each word WD is stored in 8 corresponding memory cells Mfg of a same row (8×2=16 bits). The words are logically grouped into pages PG, each one being formed by four consecutive words. Information is stored using an error correction code, wherein a block of control information (8 bits) is associated with each page PG.

A row decoder (ROW_DEC) 110r is used for selecting a word line WL, while a column decoder (COL_DEC) 110c is used for selecting the bit lines BL of two consecutive pages (in the selected row) at the same time. Each word stored in the matrix 105 is identified by an address ADR. The address ADR is formed by a row address ROW_ADR (being provided to the row decoder 110r) and by a column address COL_ADR (a portion thereof being provided to the column decoder 110c). In the example at issue, each row includes 1024 memory cells Mfg (of 2 bits) and then 1024/8=128 words WD (of 16 bits); therefore, the column address COL_ADR includes 7 bits $A_6A_5A_4A_3A_2A_1A_0$ ($2^7$=128).

The column decoder 110c is connected to a reading unit (SA) 115, which outputs the two pages that are read at the same time from the matrix 105 (defined by the values stored in the corresponding memory cells Mfg), together with the associated two blocks of control information. The pair of read pages and the respective blocks of control information are transmitted to a decoder ECC 120. The decoder ECC 120 calculates a syndrome for each read page, which is provided to a corresponding decoder (SYND) 125. A correction unit (CORR) 130 is input the pages (possibly) to correct from the decoder ECC 120 (which pages can be either the same or different from the read pages) and a set of correction bits from the syndrome decoder 125. The unit 130 corrects (if possible) the input pages according to the corresponding correction bits. The corrected pages so obtained are latched in an output buffer (BFR) 135. The syndrome decoder 125 further generates a signal FAIL, which is asserted for signaling errors that cannot be corrected in the pair of read pages.

A portion of the column address COL_ADR is provided to a counter (CONT) 140, modulo 8. The counter 140 increments the value stored therein of one unit in response to a clock signal Ck. A decoder 145 asserts a selection signal $S_0$–$S_7$ corresponding to the value received from the counter 140. The selection signals $S_0$–$S_7$ control the outputting of the corresponding word WD latched in the buffer 135. As a consequence, it is possible to perform a reading of the memory 100 in the burst mode, wherein a series of four consecutive words is output in succession at every clock signal Ck, starting from the word selected by the address ADR.

Similar considerations apply if the memory has a different structure, if the memory cells are formed by equivalent devices or they store a different number of bits, if a different non-volatile memory is used (for example, an EPROM), if the matrix, the words and/or the pages have different dimensions (and therefore a different number of address bits are used), if information is stored using a different control code (for example, that is only able to detect but not to correct the errors), if the pages read at the same time and/or the words output in the burst mode are in a different number, and the like.

Figure 2A:
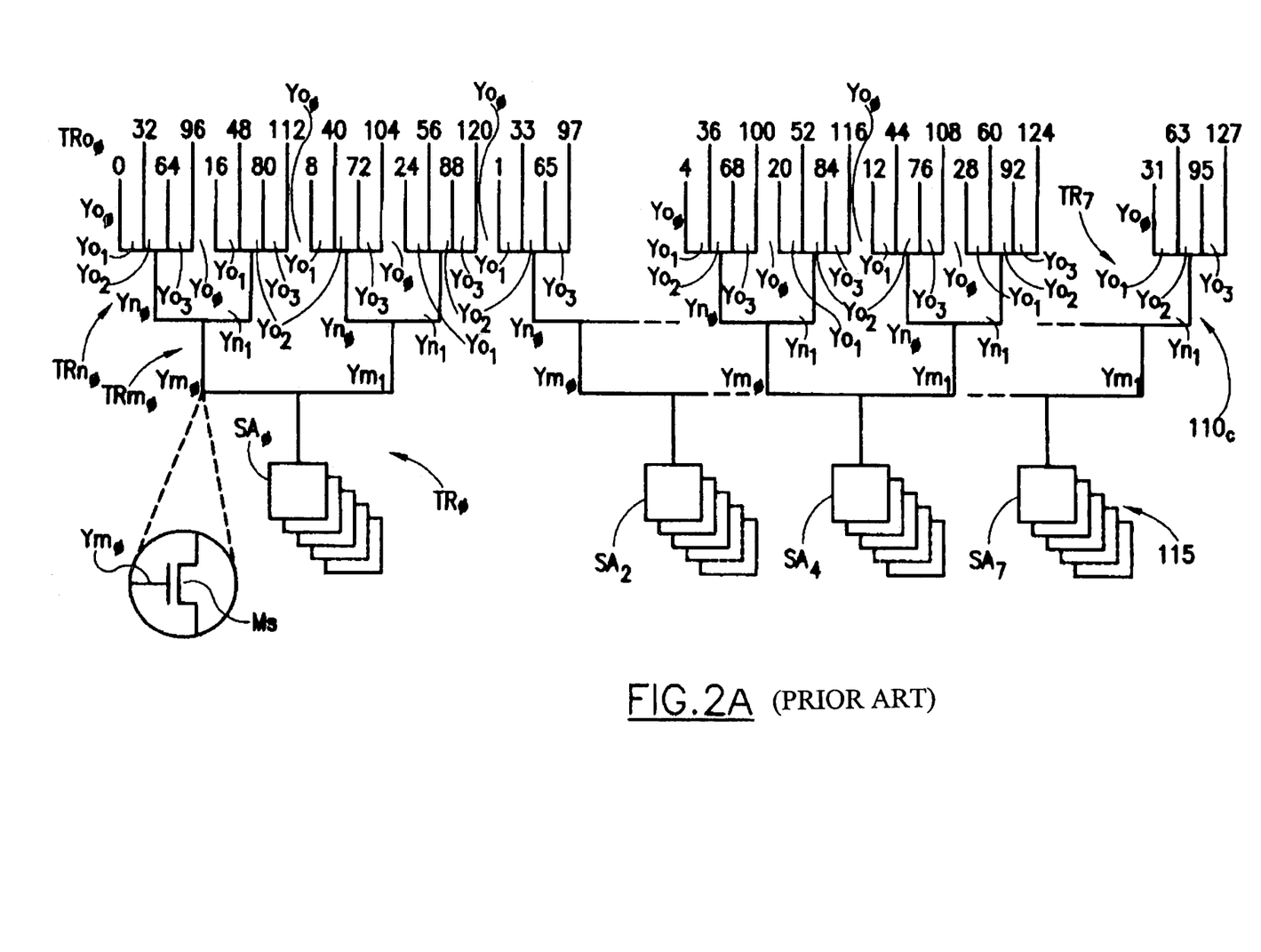
FIGS. 2a and 2b show a decoding structure according to the prior art in schematic form.

Considering now FIG. 2a, the reading unit 115 is formed by eight sets of sense amplifiers $SA_0$–$SA_7$, for the respective words of the pair of read pages. Each set $SA_0$–$SA_7$ includes eight sense amplifiers, each one reading a corresponding memory cell (2 bits) of the respective word in the selected pair of pages.

In a standard decoding structure known in the art, as shown in the figure, the column decoder 110c selectively connects the sense amplifiers of each set $SA_0$–$SA_7$ to a distinct packet of bit lines through a set of selection MOS transistors Ms. The selection transistors Ms are organized into sets of tree structures $TR_0$–$TR_7$ at three levels ($TR_{m0}$–$TR_{m7}$, $TR_{n0}$–$TR_{n7}$ and $TR_{o0}$–$TR_{o7}$).

Particularly, each tree $TR_0$–$TR_7$ has a root that is directly connected to the corresponding sense amplifier $SA_0$–$SA_7$. The first level $TR_{m0}$–$TR_{m7}$ of each tree includes two legs (branching from the root). The selection transistor Ms of the first branch of all the trees $TR_0$–$TR_7$ is controlled by the same selection signal $Y_{m0}$, while the selection transistor Ms of the second branch of all the trees $TR_0$–$TR_7$ is controlled by the same selection signal $Y_{m1}$. The second level $TR_{n0}$–$TR_{n7}$ of each tree includes a set formed by two branches for each branch of the first level $TR_{m0}$–$TR_{m7}$ (2×2=4 branches). The selection transistors Ms of the first branch and of the second branch of each set (in all the trees $TR_0$–$TR_7$) are controlled by the same selection signals $Y_{n0}$ and $Y_{n1}$, respectively. The third level $TR_{o0}$–$TR_{o7}$ of each tree includes a set formed by four branches for each branch of the second level $TR_{n0}$–$TR_{n7}$ (4×4=16 branches). The selection transistors Ms of the first, the second, the third and the fourth branches of each set (in all the trees $TR_0$–$TR_7$) are controlled by the same selection signals $Y_{o0}$, $Y_{o1}$, $Y_{o2}$ and $Y_{o3}$, respectively. Each branch of the third level $TR_{o0}$–$TR_{o7}$ is directly connected to a corresponding bit line.

Considering, for example, the trees of the set $TR_0$ (for the sense amplifiers of the set $SA_0$), the first branches of the first set are connected to the bit lines associated with the word $WD_0$ (in every row), the first branches of the second set are connected to the bit lines associated with the word $WD_{16}$, the first branches of the third set are connected to the bit lines associated with the word $WD_8$, and the first branches of the fourth set are connected to the bit lines associated with the word $WD_{24}$. The second branches of the first set are instead connected to the word $WD_{32}$, the second branches of the second set are connected to the word $WD_{48}$, the second branches of the third set are connected to the word $WD_{40}$ and the second branches of the fourth set are connected to the word $WD_{56}$. The third branches of the first set, of the second set, of the third set and of the fourth set are likewise connected to the word $WD_{64}$, to the word $WD_{80}$, to the word $WD_{72}$, and to the word $WD_{88}$, respectively. Finally, the fourth branches of the first, the second, the third and the fourth sets are connected to the words $WD_{96}$, $WD_{112}$, $WD_{104}$ and $WD_{120}$, respectively. The branches of the trees of the set $TR_1$ (for the sense amplifiers of the set $SA_1$) are connected to the adjacent words from $WD_1$ to $WD_{121}$ (every eight words), and so on until the branches of the trees of the set $TR_7$ that are connected to the words from $WD_7$ to $WD_{127}$ (every eight words).

In this way, the sense amplifiers of the set $SA_0$ can read the first word ($WD_0$, $WD_8$, ... $WD_{120}$) of each even page (from $PG_0=WD_0WD_1WD_2WD_3$ to $PG_{30}=WD_{120}WD_{121}WD_{122}WD_{123}$); the sense amplifiers of the set $SA_1$, of the set $SA_2$ and of the set $SA_3$ can likewise read the second ($WD_1$, $WD_9$, ... $WD_{121}$), the third ($WD_2$, $WD_{10}$, ... $WD_{122}$), and the fourth ($WD_3$, $WD_{11}$, ... $WD_{123}$) words of each even page, respectively. The sense amplifiers of the sets $SA_4$, $SA_5$, $SA_6$ and $SA_7$ are instead bound to read the first ($WD_4$, $WD_{12}$, ... $WD_{124}$), the second ($WD_5$, $WD_{13}$, ... $WD_{125}$), the third ($WD_6$, $WD_{14}$, ... $WD_{126}$), and the fourth ($WD_7$, $WD_{15}$, ... $WD_{127}$) words, respectively, of each odd page (from $PG_1=WD_4WD_5WD_6WD_7$ to $PG_{31}=WD_{124}WD_{125}WD_{126}WD_{127}$).

Figure 2B:
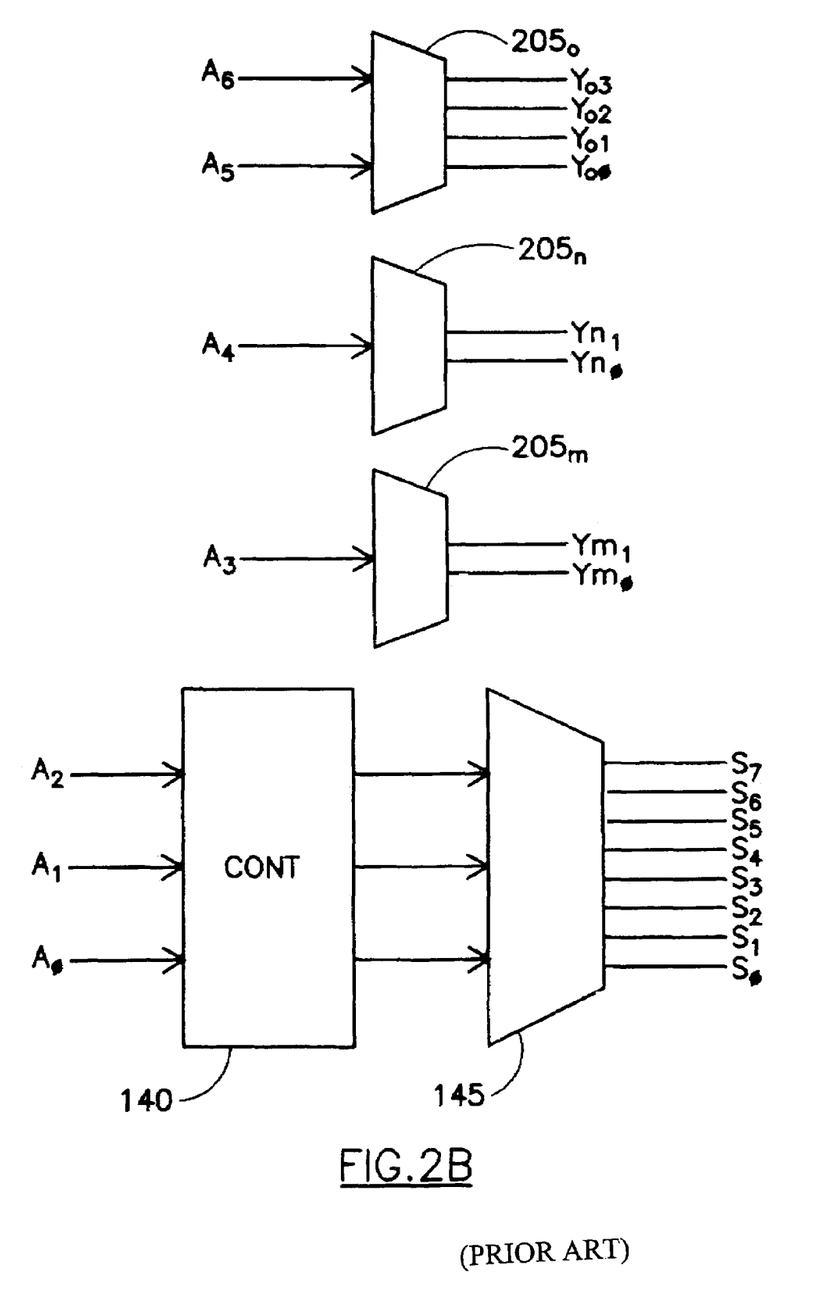

As shown in FIG. 2b, the selection signals $Y_{m0}$–$Y_{m1}$ are generated by a decoder 205m, which is input the bit $A_3$ of the column address COL_ADR (with the selection signal $Y_{m0}$ that is asserted for $A_3$=0 and the selection signal $Y_{m1}$ that is asserted for $A_3$=1). The selection signals $Y_{n0}$–$Y_{n1}$ are likewise generated by a decoder 205n, which is input the bit $A_4$ (of the column address COL_ADR). A further decoder 205o generates the selection signals $Y_{o0}$–$Y_{o3}$ in response to the bits $A_6A_5$. The bits $A_2A_1A_0$ are instead provided to the counter 140. The counter 140 accordingly drives the decoder 145, which generates the selection signals $S_0$–$S_7$.

The structure described above (FIG. 2a and FIG. 2b) makes it possible to read four consecutive words in the burst mode starting from any position in an even page. For example, let us consider that we wish to perform the burst reading starting (in a generic selected row) from the word $WD_9$ ($A_6A_5A_4A_3A_2A_1A_0=0001001$). The most significant bits of the column address COL_ADR ($A_6A_5A_4A_3=0001$) identify the corresponding pair of pages $PG_2=WD_8WD_9WD_{10}WD_{11}$ and $PG_3=WD_{12}WD_{13}WD_{14}WD_{15}$. Particularly, the decoders 205m, 205n and 205o assert the selection signals $Ym_1$ ($A_3=1$), $Yn_0$ ($A_4=0$) and $Yo_0$ ($A_6A_5=00$). Therefore, the sense amplifiers of the set $SA_0$ will read the word $WD_8$, the sense amplifiers of the set $SA_1$ will read the word $WD_9$, and so on until the sense amplifiers of the set $SA_7$ that will read the word $WD_{15}$.

The read pages are checked and possibly corrected (using the corresponding blocks of control information), and then latched in the output buffer. The less significant bits of the column address COL_ADR ($A_2A_1A_0=001$) identify the second word in the pair of read pages. Particularly, the decoder 145 asserts the selection signal $S_1$, which controls the outputting of the word read by the corresponding set of sense amplifiers $SA_1$, ($WD_9$). The increasing of the value stored in the counter 140 causes the output of the words read by the sets of sense amplifiers $SA_2$ ($WD_{10}$), $SA_2$ ($WD_{11}$) and $SA_4$ ($WD_{12}$) in succession.

However, this structure allows four consecutive words to be read in the burst mode only starting from the first position of an odd page. In fact, let us consider that we wish to perform the burst reading starting from a different position, for example, from the word $WD_{14}$ ($A_6A_5A_4A_3A_2A_1A_0=0001110$). The most significant bits of the column address COL_ADR ($A_6A_5A_4A_3=0001$) again identify the pair of pages $PG_2$ and $PG_3$ so that the same words $WD_8WD_9WD_{10}WD_{11}$ and $WD_{12}WD_{13}WD_{14}WD_{15}$ will be latched in the output buffer. In this case, it is then necessary to read also the pair of following pages ($PG_4=WD_{16}WD_{17}WD_{18}WD_{19}$ and $PG_5=WD_{20}WD_{21}WD_{22}WD_{23}$) before being able to output the desired words ($WD_{14}WD_{15}WD_{16}WD_{17}$) in the burst mode.

Figure 3A:
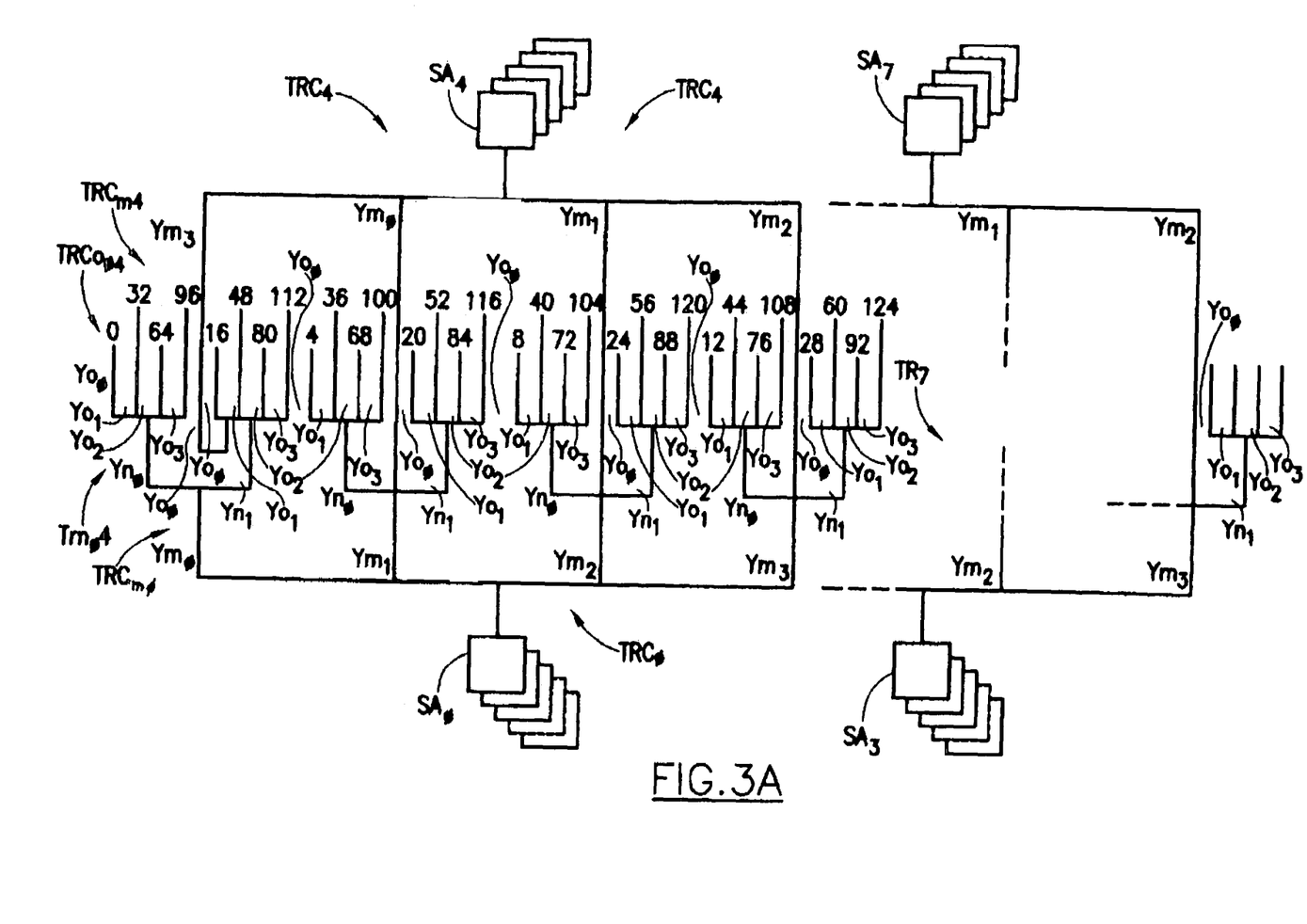
FIGS. 3a and 3b show a decoding structure according to a preferred embodiment of the invention in schematic form.
Figure 3B:
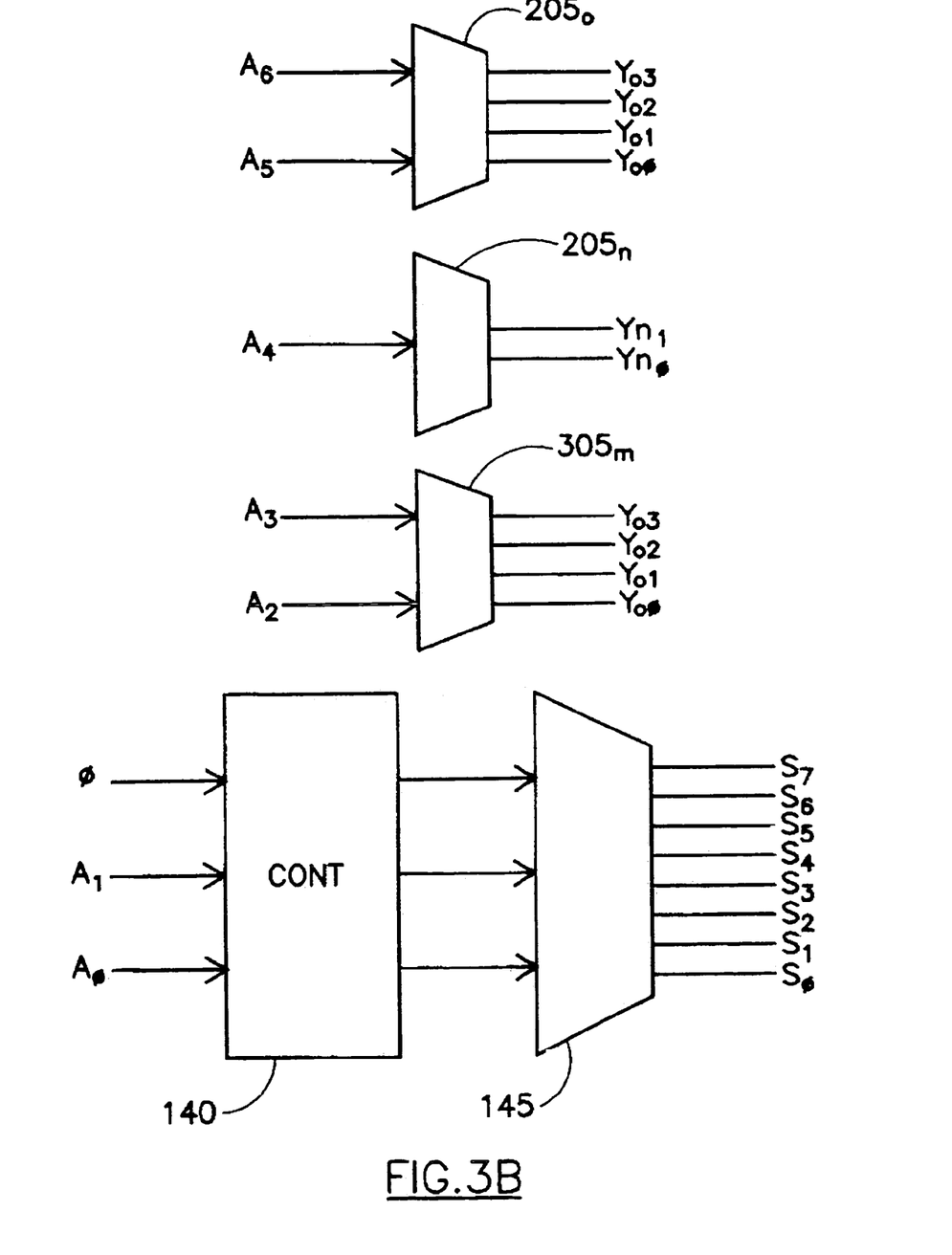

With reference now to FIGS. 3a and 3b (the elements corresponding to the ones shown in the FIGS. 2a and 2b are identified with the same references, and their explanation is omitted for the sake of simplicity), a decoding structure according to a preferred embodiment of the present invention is shown. In this case, in contrast to the prior art, each packet of bit lines can be selectively connected to two different sets of sense amplifiers.

Particularly (FIG. 3a), the selection transistors Ms are organized into sets of tree structures $TRC_0$–$TRC_7$ having three levels. The root of each tree $TRC_0$–$TRC_7$ is directly connected to the corresponding sense amplifier $SA_0$–$SA_7$. Each tree has a first dedicated level $TRC_{m0}$–$TRC_{m7}$ that includes four legs (branching from the root). The selection transistors of the first, the second, the third and the fourth branches of all the trees $TRC_0$–$TRC_3$ are controlled by the same selection signals $Y_{m0}$, $Y_{m1}$, $Y_{m2}$ and $Y_{m3}$, respectively. The selection transistors of the first, the second, the third and the fourth branches of all the trees $TRC_4$–$TRC_7$ are controlled by the same selection signals staggered according to a circular list, that is $Ym_3$, $Ym_0$, $Ym_1$ and $Ym_2$, respectively.

A second level $TRCn_{04}$, $TRCn_{15}$, $TRCn_{26}$ and $TRCn_{37}$ is partially shared between each pair of trees of the sets $TRC_0/TRC_4$, $TRC_1/TRC_5$, $TRC_2/TRC_6$ and $TRC_3/TRC_7$, respectively. In detail, the second level of the trees $TRC_0$–$TRC_3$ includes a set formed by two branches for each branch of the first level $TRC_{m0}$–$TRC_{m3}$ ($2\times4=8$ branches). The second, the third and the fourth branches of the first level of the trees $TRC_4$–$TRC_7$ are connected to the same sets of branches of the second level of the corresponding trees $TRC_0$–$TRC_3$. The first branch of the first level of the trees $TRC_4$–$TRC_7$ is instead connected to a further set (formed by a single branch) of the second level. The selection transistors of the first and the second branches of each set in all the trees $TRC_0$–$TRC_7$ (with the exception of the first set of the trees $TRC_4$–$TRC_7$) are controlled by the same selection signals $Y_{n0}$ and $Y_{n1}$, respectively. The single branch that forms the first set of the second level of the trees $TRC_4$–$TRC_7$ is controlled by the selection signal $Y_{n0}$.

Each tree then has a third level $TRCo_{04}$–$TRCo_{37}$ that is shared between each respective pair of trees of the sets $TRC_0/TRC_4$, $TRC_1/TRC_5$, $TRC_2/TRC_6$ and $TRC_3/TRC_7$. The third level $TRCo_{04}$–$TRCo_{37}$ includes a set formed by four branches for each branch of the second level $TRCn_{04}$–$TRCn_{37}$ ($4\times4=16$ branches). The branches of the first set of the second level of the trees $TRC_4$–$TRC_7$ are connected to the sets of branches of the third level in a staggered way, with respect to the corresponding branches of the first set of the second level of the trees $TRC_0$–$TRC_3$. In the example illustrated in the figure, the first set of the second level of the trees $TRC_4$–$TRC_7$ includes a single branch, which is connected to the second set of branches of the third level. The selection transistors of the first, the second, the third and the fourth branches of each set of the third level $TRCo_{04}$–$TRCo_{37}$ (in all the trees $TRC_0$–$TRC_7$) are controlled by the same selection signals $Yo_0$, $Yo_1$, $Yo_2$ and $Yo_3$, respectively. Each branch of the third level $TRCo_0$–$TRCo_7$ is directly connected to the corresponding bit line.

The structure described above exploits a word mapping that is different than the one of the standard decoding structure. Considering, for example, the pair of sets of trees $TRC_0$ and $TRC_4$ (for the sense amplifiers of the sets $SA_0$ and $SA_4$, respectively), the mapping is obtained from the standard one inserting pairs of sets of adjacent branches of the trees $TR_0$ and $TR_4$ (as illustrated in FIG. 2a). Particularly, the branches of the first and of the second sets that can be reached from the first branch of the first level are connected to the bit lines associated with the words (in each line) $WD_0$, $WD_{32}$, $WD_{64}$, $WD_{96}$ and with the words $WD_{16}$, $W_{48}$, $WD_{80}$, $WD_{112}$, respectively. The branches of the first and of the second sets that can be reached from the second branch of the first level are connected to the bit lines associated with the words $WD_4$, $WD_{36}$, $WD_{68}$, $WD_{100}$ and with the words $WD_{20}$, $W_{52}$, $WD_{84}$, $WD_{116}$, respectively. Likewise, the branches that can be reached from the third branch of the first level are connected to the bit lines associated with the words $WD_8$, $WD_{40}$, $W_{72}$, $WD_{104}$ and $WD_{24}$, $W_{56}$, $WD_{88}$, $WD_{120}$, and the branches that can be reached from the fourth branch of the first level are connected to the bit lines associated with the words $WD_{12}$, $WD_{44}$, $W_{76}$, $WD_{108}$ e $WD_{28}$, $W_{60}$, $WD_{92}$, $WD_{124}$. The branches of the pair of trees of the sets $TRC_1$ and $TRC_5$ are likewise connected to the adjacent words from $WD_1$ to $WD_{121}$ (every 4), and so on until the branches of the pair of trees of the sets $TRC_3$ and $TRC_7$ that are connected to the words from $WD_7$ to $WD_{127}$ (every 4).

Therefore, the sense amplifiers of the set $SA_0$ and of the set $SA_4$ can alternatively read either the first word ($WD_0$, $WD_8$, . . . $WD_{120}$) of each even page (from $PG_0=WD_0WD_1WD_2WD_3$ to $PG_{30}=WD_{120}WD_{121}WD_{122}WD_{123}$) or the first word ($WD_4$, $WD_{12}$, . . . $WD_{124}$) of each odd page (from $PG_1=WD_4WD_5WD_6WD_7$ to $PG_{31}=WD_{124}WD_{125}WD_{126}WD_{127}$). Likewise, the sense amplifiers of the sets $SA_1SA_5$, of the sets $SA_2SA_6$ and of the sets $SA_3SA_7$ can read the second, the third and the fourth words, respectively, either of the even pages or of the odd pages, that is $(WD_1, WD_9, \ldots WD_{121})$–$(WD_5, WD_{13}, \ldots WD_{125})$, $(WD_2, WD_{10}, \ldots WD_{122})$–$(WD_6, WD_{14}, \ldots WD_{126})$ and $(WD_3, WD_{11}, \ldots WD_{123})$–$(WD_7, WD_{15}, \ldots WD_{127})$, respectively.

As in the structure described in the foregoing (FIG. 3*b*), the selection signals $Yn_0$–$Yn_1$ and the selection signals $Yo_0$–$Yo_3$ are generated by the decoder 205*n* (in response to the bit $A_4$ of the column address COL_ADR) and by the decoder 205*o* (in response to the bits $A_6A_5$), respectively. A different decoder 305*m* instead generates the selection signals $Ym_0$–$Ym_3$ in response to the bits $A_3A_2$. The counter 140 only receives the bits $A_1A_0$, while the most significant input bit is maintained at the logic value 0. The counter 140 then drives the decoder 145 like in the previous case.

The structure described above makes it possible to read four consecutive words in the burst mode starting from any position (either in an even page or in an odd page). For example, let us consider that we wish to perform the burst reading starting (in a generic selected row) from the word $WD_9$ ($A_6A_5A_4A_3A_2A_1A_0$=0001001). The bits $A_6A_5A_4A_3A_2$=00010 of the column address identify the first page of the corresponding pair ($PG_2=WD_8WD_9WD_{10}WD_{11}$ and $PG_3=WD_{12}WD_{13}WD_{14}WD_{15}$). Particularly, the decoders 305*m*, 205*n* and 205*o* assert the selection signals $Ym_2$ ($A_3A_2$=10), $Yn_0$ ($A_4$=0) and $Yo_0$ ($A_6A_5$=00). Therefore, the sense amplifiers of the set $SA_0$ will read the word $WD_8$, the sense amplifiers of the set $SA_1$ will read the word $WD_9$, the sense amplifiers of the set $SA_2$ will read the word $WD_{10}$ and the sense amplifiers of the set $SA_3$ will read the word $WD_{11}$. At the same time, the sense amplifiers of the sets $SA_4$, $SA_5$, $SA_6$ and $SA_7$ will read the words $WD_{12}$, $WD_{13}$, $WD_{14}$ and $WD_{15}$, respectively.

The read pages are checked, (possibly) corrected and then latched in the output buffer. The less significant bits of the column address COL_ADR ($A_1A_0$=01) identify the second word in the pair of read pages. Particularly, the decoder 145 asserts the selection signal $S_1$, which controls the outputting of the word read by the corresponding set of sense amplifiers $SA_1$ ($WD_9$). The increase of the value stored in the counter 140 causes the outputting of the words read by the sets of sense amplifiers $SA_2$ ($WD_{10}$), $SA_3$ ($WD_{11}$) and $SA_4$ ($WD_{12}$) in succession.

Likewise, let us consider that we wish now to perform the burst reading starting from the word $WD_{14}$ ($A_6A_5A_4A_3A_2A_1A_0$=0001110). The bits $A_6A_5A_4A_3A_2$=00011 of the column address identify the first page of the next pair ($PG_3=WD_{12}WD_{13}WD_{14}WD_{15}$ and $PG_4=WD_{16}WD_{17}WD_{18}WD_{19}$). Particularly, the decoders 305*m*, 205*n* and 205*o* assert the selection signals $Ym_3$ ($A_3A_2$=11), $Yn_0$ ($A_4$=0) e $Yo_0$ ($A_6A_5$=00). Therefore, the sense amplifiers of the sets $SA_0$, $SA_1$, $SA_2$ and $SA_3$ will read the words $WD_{12}$, $WD_{13}$, $WD_{14}$ e $WD_{15}$, respectively. At the same time, the sense amplifiers of the sets $SA_4$, $SA_5$, $SA_6$ and $SA_7$ will read the words $WD_{16}$, $WD_{17}$, $WD_{18}$ e $WD_{19}$, respectively. The less significant bits of the column address COL_ADR ($A_1A_0$=10) identify the third word in the pair of read pages. Particularly, the decoder 145 asserts the selection signal $S_2$, which controls the outputting of the word read by the corresponding set of sense amplifiers $SA_2$ ($WD_{14}$). The increase of the value stored in the counter 140 causes the outputting of the words read by the sets of sense amplifiers $SA_3$ ($WD_{15}$), $SA_4$ ($WD_{16}$) e $SA_5$ ($WD_{17}$) in succession.

In the structure described above, the selection signals $Yo_0$–$Yo_4$ associated with the two most significant bits $A_6A_5$ are shared among all the trees $TRC_0$–$TRC_7$. Therefore, such structure does not allow the reading between values involving any changes of these bits, that is every 32 words in the example at issue (27–2=25=32). In fact, let us consider that we wish to perform the burst reading starting from the word $WD_{29}$ ($A_6A_5A_4A_3A_2A_1A_0$=0011101). In this case, the decoders 305*m*, 205*n* and 205*o* assert the selection signals $Ym_3$ ($A_3A_2$=11), $Yn_1$ ($A_4$=1) and $Yo_0$ ($A_6A_5$=00). Therefore, the sense amplifiers of the sets $SA_0$, $SA_1$, $SA_2$ and $SA_3$ will read the words $WD_{28}$, $WD_{29}$, $WD_{30}$ e $WD_{31}$, respectively; however, the sense amplifiers of the sets $SA_4$, $SA_5$, $SA_6$ and $SA_7$ are not connected to any bit line (since the words $WD_{32}$, $WD_{33}$, $WD_{34}$ and $WD_{35}$ cannot be read using the same selection signals $Yo_0$–$Yo_3$).

Similar considerations apply if each packet of bit lines can be connected to three or more sets of sense amplifiers, if the selection transistors are organized into trees with a different number of levels, if each level includes a different number of sets each one formed by a different number of branches, if the selection transistors are replaced with equivalent elements or they are controlled by different signals, and the like. Alternatively, each tree has a different number of dedicated levels and/or shared levels, the selection signals of the first level are staggered in a different way, the branches of the first set of the second level are connected in a different way to the sets of branches of the third level, the words are mapped on the bit lines in another way, the selection signals are generated in a different manner from the column address, and the like.

More generally, the present invention provides a decoding structure for a memory device with control code. The memory device includes a matrix of memory cells grouped into pages, to each one a block of control information is associated. The memory device further includes a plurality of reading elements for reading a plurality of pages in parallel. The decoding structure includes means for selectively connecting each reading element to a plurality of memory cells. In the structure of the invention, means are further provided for selectively connecting each memory cell to a plurality of reading elements.

The invention makes it possible to remove some restraints imposed by the standard decoding to the operation of the corresponding memory device. Particularly, this allows readings in the burst mode to be performed starting substantially from every position (without requiring the introduction of any wait cycle).

Such result is achieved with a structure very simple, which does not require the addition of further paths nor of further selection signals. Moreover, the management of the selection signals needed by the present invention is extremely simple and involves small changes to the existing memory devices.

The preferred embodiment of the invention described above offers further advantages. Particularly, the selection elements are organized into trees with one or more levels that are shared among sets of corresponding trees. This invention allows a very simple and effective implementation of structure. In a preferred embodiment, each tree has an intermediate level that is partially shared among the trees of each set.

Advantageously, the branches of a first set of the intermediate level are connected in a staggered way to the corresponding sets of branches of the shared level. This structure makes it possible to reach the desired purpose with a mapping of the words that is simple and immediate.

However, the approach according to the present invention leads itself to be implemented even with the selection elements organized in a different way (even in a single level), with a different intermediate level, or even without any intermediate level partially shared among the trees of each set.

In a preferred embodiment of the invention, the corresponding selection elements in each non-shared level of the trees of each set are controlled by different first selection signals. This makes it always possible to use the same selection signals simply changing their order. As a further enhancement, the corresponding selection elements are controlled by adjacent selection signals (according to a circular list). In this way, the desired purpose can be reached with a structure of immediate implementation.

Advantageously, the read words are selected using selection signals generated in response to a portion of a corresponding word address, with the addition of one or more bits having a preset value. In this way, the selection signals are managed in a way similar to the one used in the existing memory devices. Alternatively, the corresponding selection elements in each non-shared level are controlled in a different way, non-adjacent selection signals are used, the read words are selected using signals produced in another way, and the like.

The decoding structure according to the present invention is preferably embedded in a memory device that supports a burst reading mode (even if other applications are contemplated and within the scope of the invention).

The use of the proposed decoding structure is particularly advantageous in a not-volatile multilevel memory. However, the present invention leads itself to be used in a memory device of a different type, for example, a volatile memory or a memory with two-level cells. Naturally, in order to satisfy local and specific requirements, a person skilled in the art may apply to the invention described above many modifications and alterations all of which, however, are included within the scope of protection of the invention as defined by the following claims.

That which is claimed is:

1. A decoding structure for a memory device with a control code and including a matrix of memory cells grouped into pages to each one of which a block of control information is associated, and a plurality of reading elements for reading a plurality of pages in parallel, the decoding structure comprising:
 a first circuit for selectively connecting each reading element to a plurality of memory cells; and
 a second circuit for selectively connecting each memory cell to the plurality of reading elements.

2. The decoding structure according to claim 1 wherein the first and second circuits include a plurality of selection elements grouped into blocks each organized into a tree with a plurality of levels, the tree having a root connected to a corresponding reading element and a last level connected to corresponding memory cells, and wherein at least one level starting from the last level is shared in a set formed by a plurality of trees associated with different reading elements.

3. The decoding structure according to claim 2 wherein each tree further includes an intermediate level directly connected to the at least one shared level, the intermediate level being partially shared among the trees of a corresponding set.

4. The decoding structure according to claim 3 wherein each level includes a set of branches for each branch of an immediately higher level, wherein the intermediate level has each set of branches with an exception of a first set of branches that is shared among the trees of the corresponding set of branches, and wherein the branches of the first set are connected in a staggered way to corresponding sets of branches of the at least one shared level.

5. The decoding structure according to claim 4 wherein said first and second circuits comprise a first decoder circuit for generating a plurality of first selection signals each one for simultaneously controlling a corresponding selection element in each tree, and wherein corresponding selection elements in each non-shared level of the trees of each set are controlled by different first selection signals.

6. The decoding structure according to claim 5 wherein the first selection signals associated with each non-shared level are ordered according to a circular list, and wherein the corresponding selection elements in each non-shared level of the trees of each set are controlled by adjacent first selection signals according to the circular list.

7. The decoding structure according to claim 6 wherein each page includes a plurality of words, wherein said first and second circuits comprise a second decoder circuit for generating a plurality of second selection signals each one for controlling outputting of a correspondent word of read pages, and wherein the first decoder circuit is controlled by a first portion of a word address formed by a plurality of bits and the second decoder circuit is controlled by a value obtained by adding at least one bit having a preset value to a second portion of the word address.

8. A memory device comprising:
 a matrix of memory cells grouped into pages to each of which a block of control information is associated;
 a plurality of reading elements for reading a plurality of pages in parallel; and
 a decoding structure for selectively connecting each reading element to a plurality of memory cells, and for selectively connecting each memory cell to the plurality of reading elements.

9. The memory device according to claim 8 wherein said decoding structure comprises a plurality of selection elements grouped into blocks each organized into a tree with a plurality of levels, the tree having a root connected to a corresponding reading element and a last level connected to corresponding memory cells, and wherein at least one level starting from the last level is shared in a set formed by a plurality of trees associated with different reading elements.

10. The memory device according to claim 9 wherein each tree further includes an intermediate level directly connected to the at least one shared level, the intermediate level being partially shared among the trees of a corresponding set.

11. The memory device according to claim 10 wherein each level includes a set of branches for each branch of an immediately higher level, wherein the intermediate level has each set of branches with an exception of a first set of branches that is shared among the trees of the corresponding set of branches, and wherein the branches of the first set are connected in a staggered way to corresponding sets of branches of the at least one shared level.

12. The memory device according to claim 11 wherein said decoder structure comprises a first decoder circuit for generating a plurality of first selection signals each one for simultaneously controlling a corresponding selection element in each tree, and wherein corresponding selection elements in each non-shared level of the trees of each set are controlled by different first selection signals.

13. The memory device according to claim 12 wherein the first selection signals associated with each non-shared level are ordered according to a circular list, and wherein the corresponding selection elements in each non-shared level of the trees of each set are controlled by adjacent first selection signals according to the circular list.

14. The memory device according to claim 13 wherein each page includes a plurality of words, wherein said decoder structure further comprises a second decoder circuit for generating a plurality of second selection signals each one for controlling outputting of a correspondent word of read pages, and wherein the first decoder circuit is controlled by a first portion of a word address formed by a plurality of bits and the second decoder circuit is controlled by a value obtained by adding at least one bit having a preset value to a second portion of the word address.

15. The memory device according to claim 8 further comprising an output circuit connected to said decoder structure for outputting a plurality of words of the read pages in a burst mode starting from a first word identified by a word address.

16. The memory device according to claim 8 wherein each of said memory cells comprises a non-volatile multi-level memory cell.

17. A memory device comprising:
 a matrix of non-volatile multilevel memory cells grouped into pages to each of which a block of control information is associated;
 a plurality of reading elements for reading a plurality of pages in parallel;
 a decoding structure for selectively connecting each reading element to a plurality of memory cells, and for selectively connecting each memory cell to the plurality of reading elements; and
 an output circuit connected to said decoder structure for outputting a plurality of words of read pages in a burst mode starting from a first word identified by a word address.

18. The memory device according to claim 17 wherein said decoding structure comprises a plurality of selection elements grouped into blocks each organized into a tree with a plurality of levels, the tree having a root connected to a corresponding reading element and a last level connected to corresponding memory cells, and wherein at least one level starting from the last level is shared in a set formed by a plurality of trees associated with different reading elements.

19. The memory device according to claim 18 wherein each tree further includes an intermediate level directly connected to the at least one shared level, the intermediate level being partially shared among the trees of a corresponding set.

20. The memory device according to claim 19 wherein each level includes a set of branches for each branch of an immediately higher level, wherein the intermediate level has each set of branches with an exception of a first set of branches that is shared among the trees of the corresponding set of branches, and wherein the branches of the first set are connected in a staggered way to corresponding sets of branches of the at least one shared level.

21. The memory device according to claim 20 wherein said decoder structure comprises a first decoder circuit for generating a plurality of first selection signals each one for simultaneously controlling a corresponding selection element in each tree, and wherein corresponding selection elements in each non-shared level of the trees of each set are controlled by different first selection signals.

22. The memory device according to claim 21 wherein the first selection signals associated with each non-shared level are ordered according to a circular list, and wherein the corresponding selection elements in each non-shared level of the trees of each set are controlled by adjacent first selection signals according to the circular list.

23. The memory device according to claim 22 wherein each page includes a plurality of words, wherein said decoder structure further comprises a second decoder circuit for generating a plurality of second selection signals each one for controlling outputting of a correspondent word of read pages, and wherein the first decoder circuit is controlled by a first portion of a word address formed by a plurality of bits and the second decoder circuit is controlled by a value obtained by adding at least one bit having a preset value to a second portion of the word address.

24. A method for reading a memory device comprising a matrix of memory cells grouped into pages to each of which a block of control information is associated, and a plurality of reading elements for reading a plurality of pages in parallel, the method comprising:
 using a decoding structure for selectively connecting each reading element to a plurality of memory cells, and for selectively connecting each memory cell to a plurality of reading elements.

25. The method according to claim 24 wherein the decoding structure comprises a plurality of selection elements grouped into blocks each organized into a tree with a plurality of levels, the tree having a root connected to a corresponding reading element and a last level connected to corresponding memory cells, and wherein at least one level starting from the last level is shared in a set formed by a plurality of trees associated with different reading elements.

26. The method according to claim 25 wherein each tree further includes an intermediate level directly connected to the at least one shared level, the intermediate level being partially shared among the trees of a corresponding set.

27. The method according to claim 26 wherein each level includes a set of branches for each branch of an immediately higher level, wherein the intermediate level has each set of branches with an exception of a first set of branches that is shared among the trees of the corresponding set of branches, and wherein the branches of the first set are connected in a staggered way to corresponding sets of branches of the at least one shared level.

28. The method according to claim 27 wherein the decoder structure comprises a first decoder circuit for generating a plurality of first selection signals each one for simultaneously controlling a corresponding selection element in each tree, and wherein corresponding selection elements in each non-shared level of the trees of each set are controlled by different first selection signals.

29. The method according to claim 28 wherein the first selection signals associated with each non-shared level are ordered according to a circular list, and wherein the corresponding selection elements in each non-shared level of the trees of each set are controlled by adjacent first selection signals according to the circular list.

30. The method according to claim 29 wherein each page includes a plurality of words, wherein said decoder structure further comprises a second decoder circuit for generating a plurality of second selection signals each one for controlling outputting of a correspondent word of read pages, and wherein the first decoder circuit is controlled by a first portion of a word address formed by a plurality of bits and the second decoder circuit is controlled by a value obtained by adding at least one bit having a preset value to a second portion of the word address.

31. The method according to claim 30 further comprising outputting a plurality of words of the read pages in a burst mode starting from a first word identified by a word address.

32. The method according to claim 24 wherein each of the memory cells comprises a non-volatile multilevel memory cell.

* * * * *

UNITED STATES PATENT AND TRADEMARK OFFICE
CERTIFICATE OF CORRECTION

PATENT NO. : 6,958,949 B2  Page 1 of 1
APPLICATION NO. : 10/331177
DATED : October 25, 2005
INVENTOR(S) : Emanuele Confalonieri and Marco Sforzin It is certified that error appears in the above-identified patent and that said Letters Patent is hereby corrected as shown below:

Title page (30)

Delete: "MI2002A2817"

Insert: -- MI2001A2817 --

Signed and Sealed this

Fourth Day of March, 2008

JON W. DUDAS
*Director of the United States Patent and Trademark Office*